A. C. HULL & J. S. BROWN.
Nut-Locks.
No. 139,467.  Patented June 3, 1873.
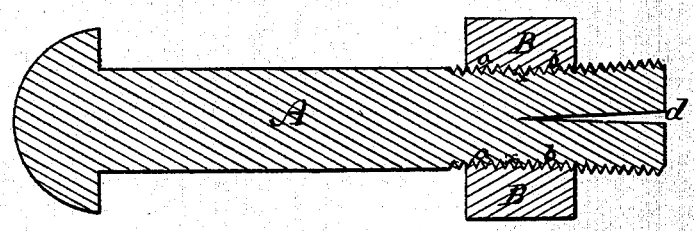
Witnesses,
S. W. Wood
J. C. Lyons
Inventors,
Abraham C. Hull,
John S. Brown,
By their atty,
J. S. Brown.

UNITED STATES PATENT OFFICE.

ABRAHAM C. HULL, OF ST. LOUIS, MISSOURI, AND JOHN S. BROWN, OF MOUNT PLEASANT, DISTRICT OF COLUMBIA, ASSIGNORS OF ONE-THIRD THEIR RIGHT TO ISAAC H. STURGEON, OF ST. LOUIS, MISSOURI.

IMPROVEMENT IN NUT-LOCKS.

Specification forming part of Letters Patent No. 139,467, dated June 3, 1873; application filed April 25, 1873.

*To all whom it may concern:*

Be it known that we, ABRAHAM C. HULL, of St. Louis, in the county of St. Louis and State of Missouri, and JOHN S. BROWN, of Mount Pleasant, in the county of Washington and District of Columbia, have invented an Improved Screw-Bolt and Nut; and we do hereby declare that the following is a full and exact description thereof, reference being had to the accompanying drawing making part of this specification, and representing an axial section of the screw-bolt and nut.

The nature of our invention consists in the combination of a screw-bolt split at the end with a nut, whose screw-thread is cut in the periphery of an aperture which is partly cylindrical and partly somewhat conical, or flaring, substantially as and for the purposes hereinafter specified.

In the drawing, A represents a railroad screw-bolt split at $d$, as shown; and B, the nut fitting upon the screw-thread of the bolt, and having its screw-thread cut in a cylindrical aperture for a portion, $a$, of its thickness, say one-half or more; and the remainder $b$ of the aperture somewhat conical, or flaring, as shown. The split $d$ in the screw-bolt is cut to such a depth as to reach into the nut about as far as the flaring part $d$ of the nut aperture reaches, when the nut is screwed upon the bolt as far as it is required to go. The split is then opened, as shown in the drawing, by driving a wedge therein, so that the screw-thread will fill the flaring part of the nut. The nut B then cannot possibly work off, but will rather tighten the more upon the bolt.

The advantages of the nut with partially flaring screw-thread aperture in connection with the split screw-bolt are important: First. Since the bolt, when spread, has substantially a partially conical screw fitting the partially conical nut, there is an active tendency to tighten the nut and to resist its unscrewing. Second. The screw is opened or spread without danger of breaking, since it begins to open inside of the nut, which resists its undue spreading and consequent weakening. Third. There is no danger of spreading the bolt too much for subsequent removal. Fourth. The bolt may be shorter, since a comparatively short projection beyond the nut suffices to enable it to be spread. Fifth. The nut can again be removed by simply turning it with a wrench, since the bolt being taper inside of the nut the latter will ride thereon and close the split-end thereof by a wedge action; whereas, if the spread of the bolt were entirely outside, the nut, with a cylindrical eye, can have no wedge-action to force itself off.

This bolt is especially valuable for railroads, to attach the fish-plates or couplings to the rails, since the nuts are completely locked upon the bolts without the possibility of working off.

What we claim as our invention, and desire to secure by Letters Patent, is—

The combination of a split screw-bolt, A, and a nut, B, having a partially conical and partially cylindrical screw-threaded aperture, substantially as and for the purposes herein specified.

Specification signed by us in presence of witnesses.

A. C. HULL.
    JOHN S. BROWN.

Witnesses to ABRAHAM C. HULL's signature:
  ISAAC H. STURGEON,
  OTHELLO OTTO RIDUER.

Witnesses to JOHN S. BROWN's signature:
  J. C. LYONS,
  EDM. F. BROWN.